Dec. 16, 1930.  C. C. HANSEN  1,785,550

HOSE CLAMP

Filed July 16, 1930

INVENTOR.
Charles C. Hansen
BY
HIS ATTORNEY

Patented Dec. 16, 1930

1,785,550

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

HOSE CLAMP

Application filed July 16, 1930. Serial No. 468,330.

This invention relates to clamping devices but more particularly to a clamp for attaching a hose of yieldable material to a tube adapted to fit inside the hose.

An object of the invention is to provide a hose clamp adjustable to fit various diameters of hose through a wide range of sizes and at the same time provide for maximum surface contact between the hose and the clamp.

Hose clamps in common use often fail to maintain surface contact with the hose over the entire circumference with the result that when constriction is placed upon the clamp it bites into the yieldable material of the hose and causes portions of it to be pinched between non-overlapping parts of the clamp, thereby weakening the hose. In some constructions this defect is avoided to some extent, but usually at the expense of causing a comparatively sharp and narrow overlapping member to cut into the hose.

My improved hose clamp avoids these defects while preserving the factor of adjustability to a relatively wide range of sizes.

Figure 1:
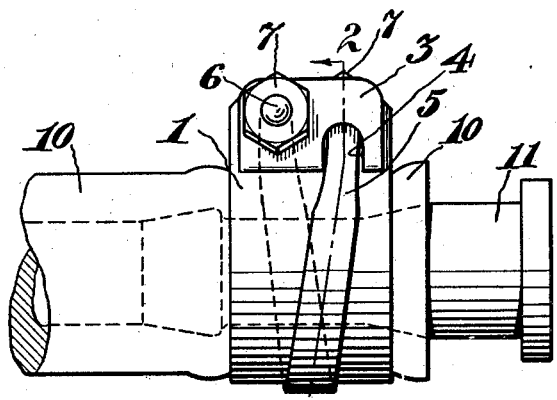
Figure 2:
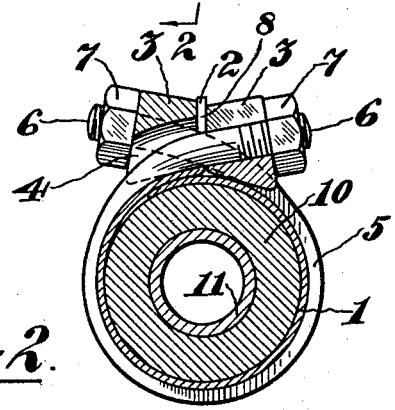
Figure 3:
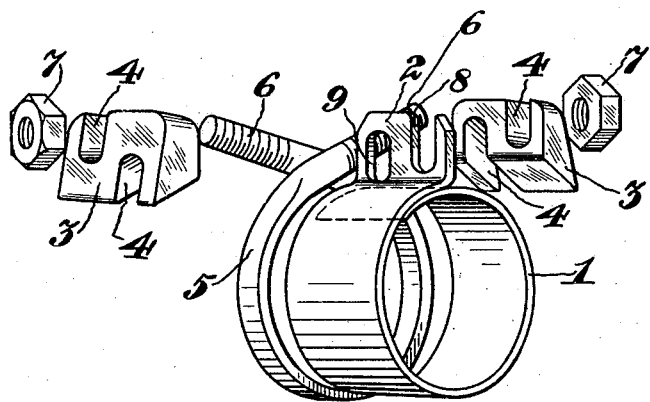

In the drawings in which similar reference characters refer to similar parts throughout Figure 1 is a side view of a hose clamp made according to my invention in position on a hose which is clamped to a tube, Figure 2 is a sectional view taken through the line 2—2 of Figure 1, and Figure 3 is a perspective view of the component parts of the clamp.

Referring to the drawings a ring member 1 consisting of a strap rolled so that its ends overlap is provided with a flange 2 by turning outwardly the overlapping end of the strap. This strap member encircles the end of a hose 10 into which a tube 11 has been inserted. The overlapping feature of the strap permits it to be expanded or contracted sufficiently to make a snug fit on the hose. The flange 2 is provided with a slot 8 and an aperture 9 adapted to receive the threaded ends 6 of a helical member 5 which is preferably flattened except at the threaded ends, and which surrounds the ring member 1.

Tapered abutment blocks 3 having slots 4 to receive the threaded ends 6 of the helical member 5 bear against the flange 2 in such a manner that the slots 4 provide continuations of the slot 8 and the aperture 9.

Nuts 7 are threaded upon the ends 6 of the spiral member 5 and bear against the abutment blocks. By turning down the nuts 7 the spiral member 5 is caused to contract its diameter and pressure is exerted upon the strap 1 causing it to contract and compress the yieldable material of the hose 10 into snug union with the connecting member 11.

By this simple device I have attained the objects hereinabove set forth.

I claim:

1. In a hose clamp or the like, a helical member, a strap fitting inside thereof having overlapping ends, a flange on said strap to engage the ends of the helical member, and means to reduce the diameter of the helical member.

2. In a hose clamp or the like, a helical member, a strap fitting inside thereof having overlapping ends, an external flange on said strap having apertures to receive the ends of the helical member and means to contract the circumference of said helical member.

3. In a hose clamp or the like, a helical member having threaded ends, a strap fitting inside thereof having overlapping ends, the outside end of said strap forming a flange having apertures to receive the ends of the helical member, abutment members having apertures to engage the ends of the helical member and adapted to bear against the sides of the flange, and nuts on the threaded ends of the helical member bearing against the outside of said abutment members to permit contracting the diameter of the helical member.

In testimony whereof I have signed this specification.

CHARLES C. HANSEN.